No. 865,958. PATENTED SEPT. 10, 1907.

J. H. STANFIELD.
MECHANICAL MOVEMENT.
APPLICATION FILED SEPT. 17, 1906.

Witnesses

Inventor
Jasper H. Stanfield.
by H. B. Willson & Co
Attorneys

UNITED STATES PATENT OFFICE.

JASPER H. STANFIELD, OF MUSKEGON, MICHIGAN.

MECHANICAL MOVEMENT.

No. 865,958.　　　　Specification of Letters Patent.　　　　Patented Sept. 10, 1907.

Application filed September 17, 1906. Serial No. 334,915.

*To all whom it may concern:*

Be it known that I, JASPER H. STANFIELD, a citizen of the United States, residing at Muskegon, in the county of Muskegon and State of Michigan, have invented certain new and useful Improvements in Mechanical Movements; and I do declare the following to be a full, clear, and exact description of the invention, such as will enable others skilled in the art to which it appertains to make and use the same.
This invention relates to improvements in mechanical movements.

The object of the invention is to provide a mechanical movement, whereby a reciprocating and an oscillating motion is simultaneously imparted to a shaft.
With the above and other objects in view, the invention consists of certain novel features of construction, combination and arrangement of parts, as will be hereinafter described and claimed.

Figure 1:
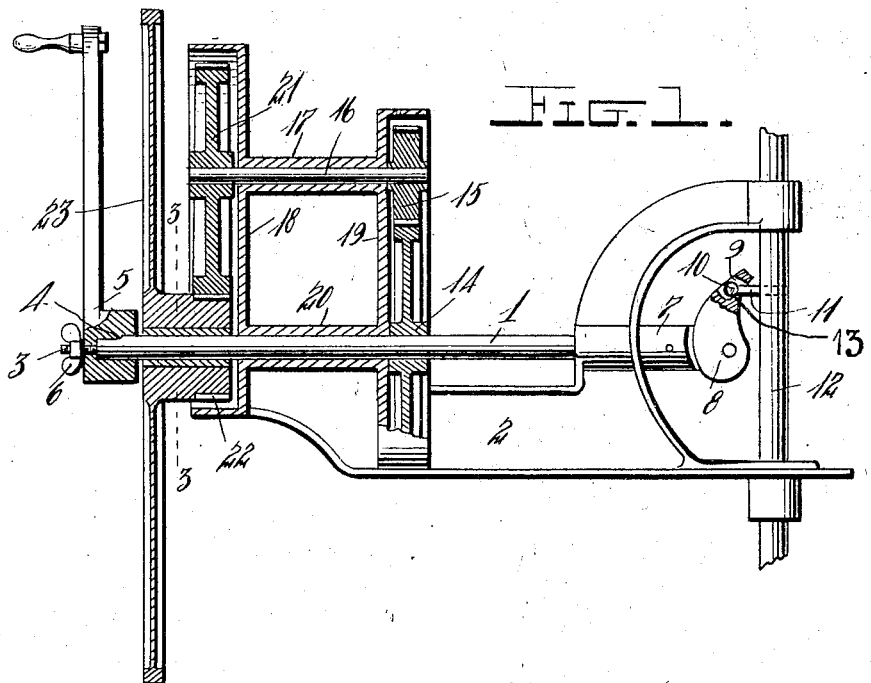
Figure 2:
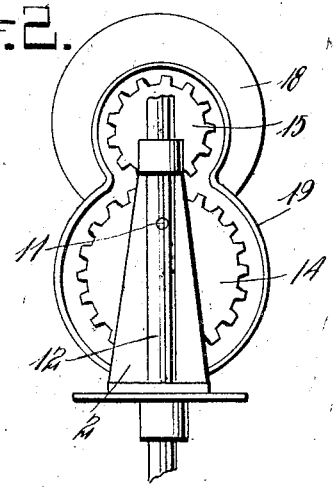
Figure 3:
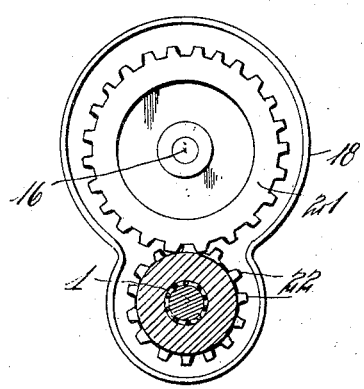
Figure 4:
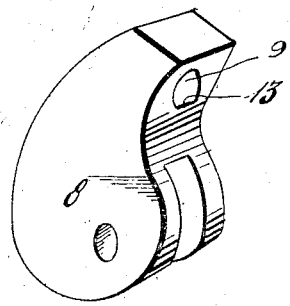

In the accompanying drawings:—Figure 1 is a side elevation, partly in section, showing the construction and arrangement of the invention; Fig. 2 is an end view of the same; Fig. 3 is a vertical sectional view on the line 3—3 of Fig. 1; and Fig. 4 is a detail perspective view of the toggle crank on the operating shaft.
The mechanical movement herein shown and described is particularly adapted for use in connection with washing machines or other machines wherein both a reciprocating and oscillating movement is desired and consists of a driving or operating shaft 1 mounted in a suitable frame 2 adapted to be secured to the body of the machine.

The outer end of the shaft 1 is reduced and threaded, as at 3, and is also provided with a squared or flattened side 4. On the outer end of the shaft 1 is mounted a crank handle 5, the head of which is bored to correspond to the reduced and flattened end of the shaft. The handle 5 is secured on said end of the shaft by a thumb screw 6, which is screwed onto the projecting threaded end of the shaft. On the opposite end of the shaft 1 is secured a fixed head 7, the outer end of which is flattened and on said flattened end of the head is pivotally mounted a link 8, the inner enlarged end of which is bifurcated to receive the flattened portion of the head 7. In the outer end of the link 8, which constitutes a motion transmitting element or member, is formed a hole or socket 9, with which is adapted to be engaged the spherical-headed end 10 of a wrist pin 11 secured to and projecting laterally from a driven shaft 12 whereby when the shaft 1 is operated the shaft 12 will be simultaneously reciprocated and oscillated.
The head 10 of the pin 11 is held in the aperture or socket 9 in the link, by means of a lip or flange 13.

Keyed or otherwise fixedly mounted on the shaft 1 midway between the ends of the same is a gear wheel 14, which is engaged by a pinion 15 mounted on one end of a counter shaft 16 journaled in a sleeve 17, which is formed integral with gear casings 18 and 19 connected to the supporting frame 2. Said casings also have formed integral therewith a bearing sleeve 20, in which the intermediate portion of the shaft 1 is journaled. On the other end of the counter shaft 16 is fixedly mounted a gear wheel 21, which is adapted to mesh with gear teeth 22 formed on the hub of a fly wheel 23, which is loosely mounted on the shaft 1 adjacent to the crank handle 5, the gear-toothed hub constituting a pinion.
The hub of the fly wheel 23 is provided with bearing rollers to engage the shaft 1, so that said fly wheel will turn freely thereon.

By connecting the fly wheel 23 with the drive shaft 1 as herein shown and described power will be transmitted from the shaft 1 back to the fly wheel, which will be driven thereby at an increased speed. Said speed will be determined by the ratio of the gears connecting the fly wheel with the shaft. The object of connecting and driving the fly wheel in this manner is to provide a velocity for the same, which will impart to the whole machine a steady and uniform motion.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:

1. A mechanical motion embodying a shaft, a pivoted motion transmitting member carried thereby, a fly wheel loose on the shaft, and a train of gears to connect the shaft and the wheel.

2. A mechanical motion embodying a shaft, a motion transmitting member carried thereby, a fly wheel loose on the shaft, a pinion carried by the fly wheel, a gear fixed on the shaft, a counter-shaft, a pinion fixed on the counter-shaft to mesh with the gear, and a gear also fixed on the counter-shaft to mesh with the fly wheel pinion.

3. A mechanical motion embodying a driving shaft and a driven shaft, means for transmitting motion from the driving to the driven shaft, a fly wheel loose on the driving shaft, and a train of gears to connect the latter shaft and the wheel.

4. A mechanical motion embodying a driving and a driven shaft, a wristpin carried by the driven shaft, a link pivoted to the driving shaft and engaging the wristpin, a fly wheel loose on the shaft, and a train of gears to connect the shaft and the wheel.

5. A mechanical motion embodying a driving and a driven shaft, a ball headed wristpin carried by the driven shaft, a link pivoted to the driving shaft and having a socket to be engaged by the ball head of the wristpin, a fly wheel loose on the shaft, and a train of gears to connect the shaft and the wheel.

In testimony whereof I have hereunto set my hand in presence of two subscribing witnesses.

JASPER H. STANFIELD.

Witnesses:
GEO. E. CAMPBELL,
ALBERT BELLINGAR.